United States Patent [19]

Lewis

[11] 4,167,735
[45] Sep. 11, 1979

[54] AIRCRAFT ORIENTATION DETERMINING MEANS

[75] Inventor: Bernard L. Lewis, Oxon Hill, Md.

[73] Assignee: The United States of America as represented by the Secretary of the Navy, Washington, D.C.

[21] Appl. No.: 934,777

[22] Filed: Aug. 18, 1978

[51] Int. Cl.$^2$ ............................ G01S 3/14; G01S 9/44
[52] U.S. Cl. .................................. 343/5 LS; 343/9 R; 343/102; 364/429; 364/447
[58] Field of Search .................... 343/5 LS, 9, 102; 364/429, 447

[56] References Cited

U.S. PATENT DOCUMENTS

| | | | |
|---|---|---|---|
| 3,185,981 | 5/1965 | Gunkel et al. | 364/447 X |
| 3,197,775 | 7/1965 | Sendler | 343/9 X |
| 3,204,237 | 8/1965 | Overcash | 343/5 LS X |
| 3,222,672 | 12/1965 | Forestier | 343/7.5 |
| 3,226,713 | 12/1965 | Sorkin et al. | 343/9 X |
| 3,564,543 | 2/1971 | Nehama et al. | 343/5 LS X |
| 3,775,766 | 11/1973 | Gendreu et al. | 343/5 LS |
| 3,788,579 | 1/1974 | Sliney | 364/429 X |
| 3,860,921 | 1/1975 | Wood | 343/9 X |

Primary Examiner—Malcolm F. Hubler
Attorney, Agent, or Firm—R. S. Sciascia; Philip Schneider

[57] ABSTRACT

A system for measuring, in conjunction with a GCA radar, the crab angle of an aircraft which is making its landing approach above a runway just prior to touch-down. Two doppler radars are placed, one on each side of the runway at equal spacings from the center line of the runway, with their antennas facing each other. The doppler radars function at very nearly the same frequency. The average doppler frequency of the echo received by each radar is determined and the frequencies are subtracted from each other. The difference in doppler frequency and the ground velocity of the aircraft are coupled to a computer which solves an equation to provide the value of the crab angle of the aircraft.

The result can be radioed to the aircraft so that an adjustment in yaw can be made to zero the crab angle before touch-down.

5 Claims, 5 Drawing Figures

AIRCRAFT ORIENTATION DETERMINING MEANS

BACKGROUND OF THE INVENTION

This invention relates to ground-based aircraft landing systems and especially to a method and means for determining the crab angle of a landing aircraft just prior to touch-down.

Ground control approach (GCA) aircraft landing systems employ radar to guide an aircraft to a point about four seconds from touch-down. At this point the radar loses altitude information because the radar cannot resolve the aircraft from its image in the ground. The landing systems also lack information about aircraft orientation with respect to the direction of the runway so that they cannot properly flare or decrab the aircraft prior to touch-down and therefore must limit landings to low crosswind conditions. A system which can determine crab angle a few seconds before touch-down so that the aircraft can be informed how much to change course to come in straight along the runway would provide a distinct improvement over present GCA systems.

SUMMARY OF THE INVENTION

The present invention utilizes two doppler radars on opposite sides of a runway to obtain echoes from opposite sides of a landing aircraft. If the aircraft has a crab angle, the frequencies will differ and the difference can be used along with the ground velocity V of the aircraft in the direction of the runway and the wavelength $\lambda$ of the radars to calculate the crab angle $\theta$ in accordance with the equation $$\theta = \arctan\left[\frac{\lambda(f_{d2} - f_{d1})}{4V}\right]$$

where $(f_{d2} - f_{d1})$ is the difference in the doppler frequencies measured by the two radars.

DETAILED DESCRIPTION OF THE INVENTION

Figure 1:
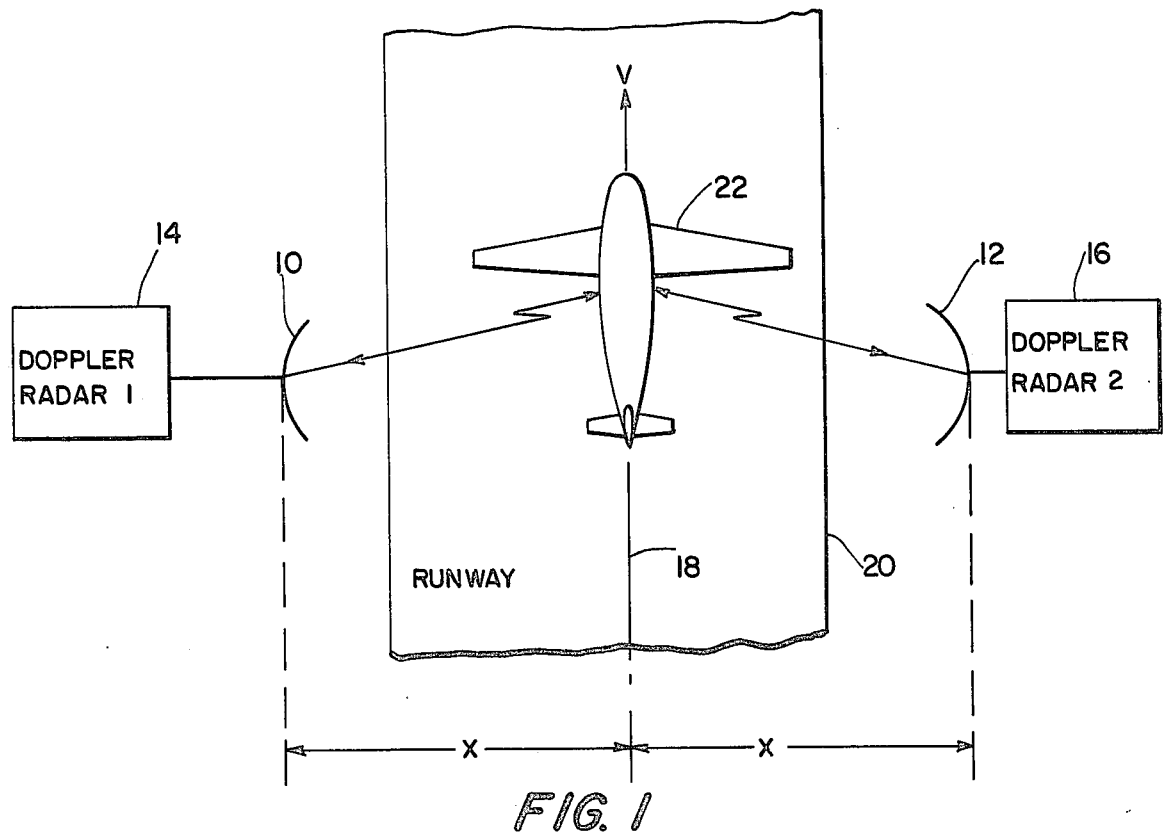
FIG. 1 is a pictoral representation of an aircraft coming in for a landing along a runway with doppler radars on either side of the runway.

This invention employs a pair of simple conventional CW doppler radar systems, each placed on opposite sides of a landing runway, as shown in FIG. 1. The antennas 10 and 12 of the radars 14 and 15 are equidistant from the center line 18 of the runway 20. The antennas illuminate opposite sides of an aircraft 22 coming in along the runway just prior to touchdown. The radars employ nearly the same carrier frequencies. Theoretically, the carrier frequencies of the radars should be equal but, to prevent interference with each other, the frequencies are made slightly different. Thus, if one radar operates at 1000 MHz, the other may be made 0.1% different, that is, 1000±1 MHz. This results in a 0.1% error in the crab angle calculated value, which is insignificant.

Each radar measures the component of the aircraft ground velocity v along the line joining the radar antenna and the dominant reflection point on its side of the aircraft. The dominant reflection point is the largest part of the aircraft structure normal to the radar beam.

If the aircraft has no crab angle $\theta$ and flies down the center line 18 of the runway, both radars will measure the same approaching or receding velocities and the doppler frequency $f_d$ given by the equation $$f_d = \frac{v}{\lambda/2} = \frac{2v}{\lambda} \tag{1}$$

where $\lambda$ is the wavelength radiated by the radars and v is the radial velocity, i.e., the velocity of the aircraft along the line connecting the center of the antenna with the dominant reflection point on the aircraft. The identical response results from the symmetry of aircraft shapes.

Figure 2:
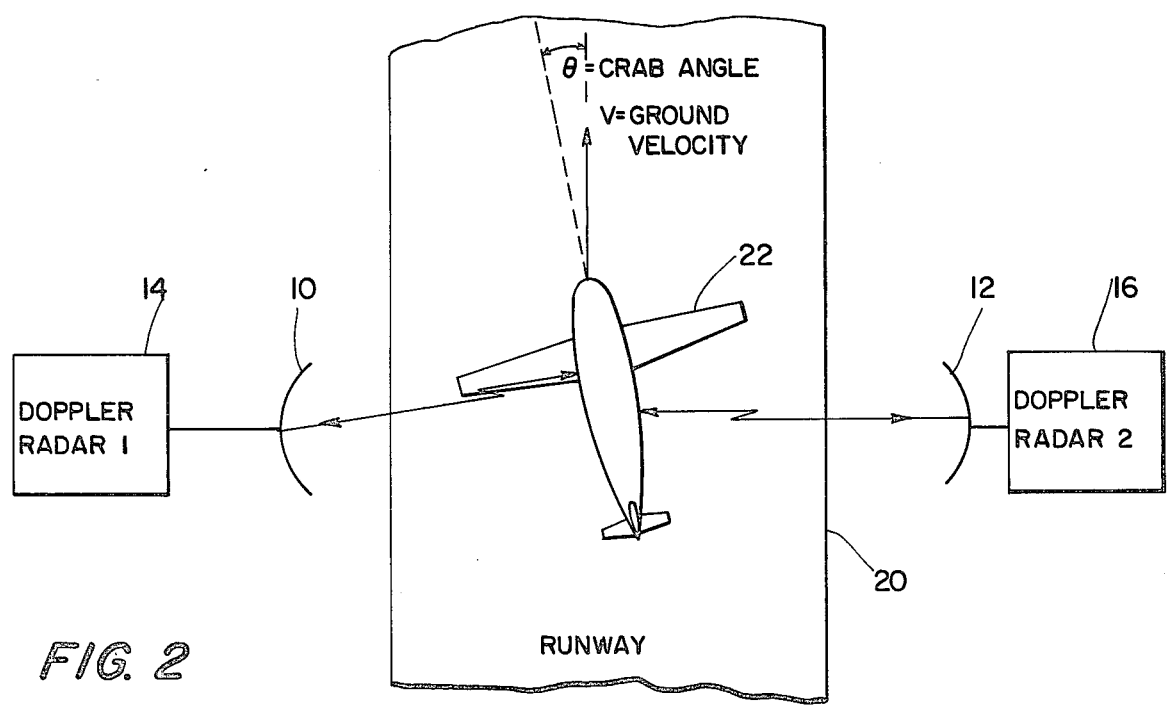
FIG. 2 is the same representation as FIG. 1 except that the aircraft is now shown with a crab angle.
Figure 3:
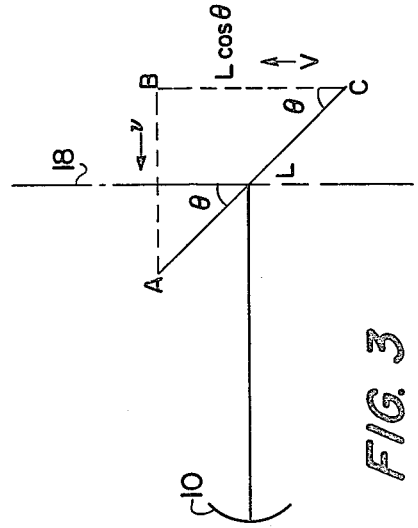
FIG. 3 is an illustration of the geometry basic to the invention.

If the aircraft has a crab angle $\theta$ toward one (14) of the radars, as shown in FIG. 2, the dominant reflection points will not be the same for both radars and the doppler velocities measured by the radars will be different. The radar on the side toward which the aircraft is crabbed will see the dominant reflection point recede as the craft flies past the radar while the radar on the other side will see its reflection point approach. Thus, the first radar will measure a down (negative) doppler and the second will measure an up (positive) doppler. Considering radar 1, with the length L of the aircraft being shown as line AC in FIG. 3, the velocity of the aircraft (which would be the receding velocity for radar 1) would be V and given by the formula $$V = \frac{D}{t_{cb}} = \frac{L \cos \theta}{t_{cb}} \tag{2}$$

where $t_{cb}$ is the time in which the aircraft travels the distance cb. The radial velocity v can then be given by $$v = \frac{AB}{t_{cb}} = \frac{L \sin \theta}{t_{cb}} \tag{3}$$

Combining equations (2) and (3) gives $$v = V \tan \theta \tag{4}$$

Putting this value for v in equation (1) gives the equation $$f_{d1} = \frac{2v}{\lambda} = -\frac{2V \tan \theta}{\lambda} \tag{5}$$

where the negative sign signifies down doppler. Similarly, $$f_{d2} = +\frac{2V \tan \theta}{\lambda} \tag{6}$$

These are the average doppler frequencies measured by radars 1 and 2.

The difference in these doppler frequencies is then $$f_{d2} - f_{d1} = \frac{4V \tan \theta}{\lambda} \qquad (7)$$

which is independent of L. The velocity of the aircraft along the runway is known (obtained from a precision approach radar, for example) and the value of λ, the radar transmitter wavelength is also a known quantity. Then the value of the crab angle θ from equation (7) would be $$\theta = \arctan \left[ \frac{\lambda(f_{d2} - f_{d1})}{4V} \right] \qquad (8)$$

This value can be relayed to the aircraft via radio transmission prior to touch-down to command the autopilot to decrab by an angle θ. The autopilot can then employ its yaw inertial reference gyro to change heading by angle θ.

Figure 4:
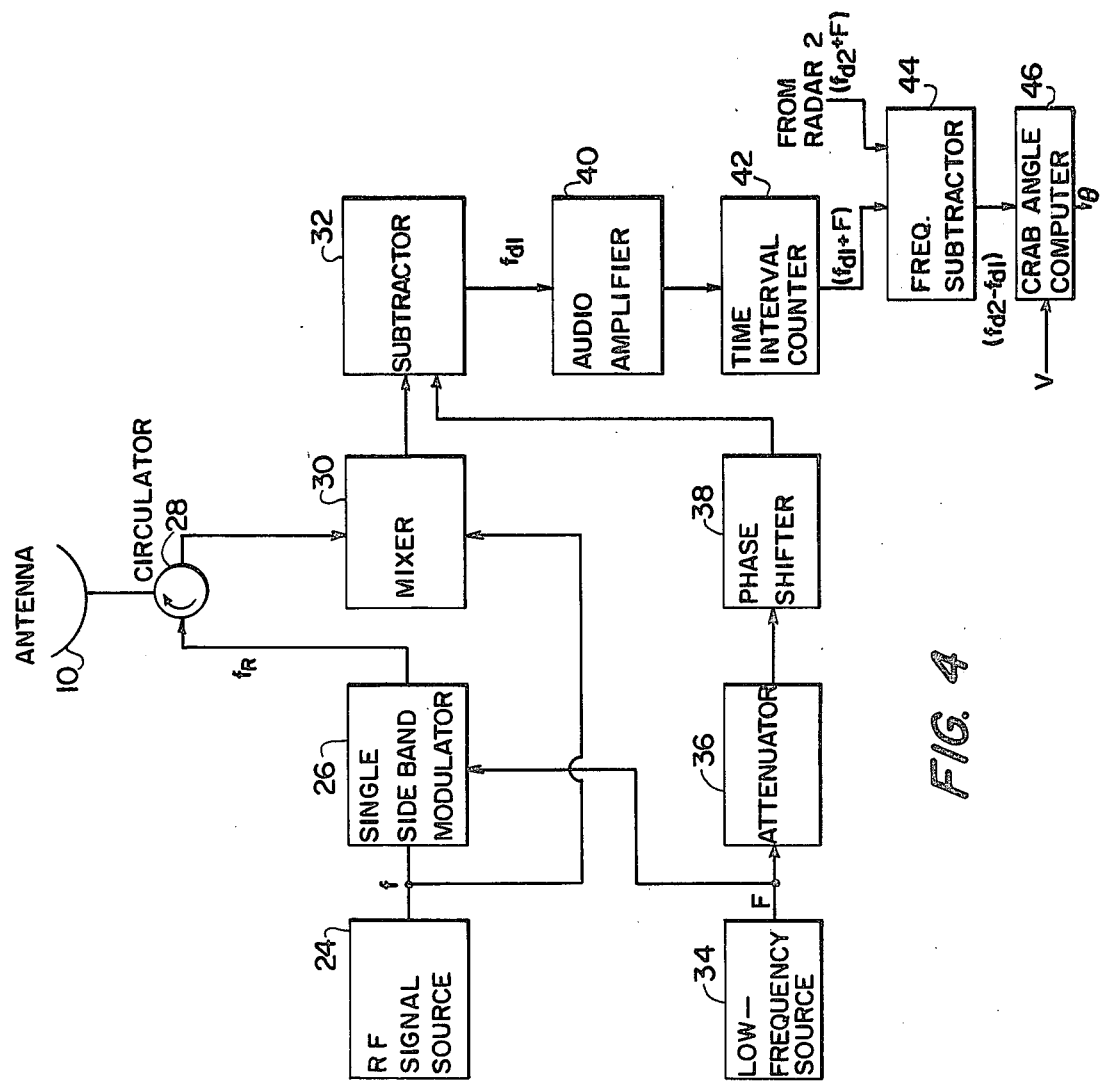
FIG. 4 is a block diagram of an embodiment of the invention.

An applicable radar system is shown in FIG. 4; this includes radar 1 comprising components 10-42 and the additional components, the frequency subtraction means 44 and the means 46 for computing the crab angle θ. A low-power, rf signal generator 24 of frequency $f \approx 1000$ MHz, for example, feeds a single sideband modulator 26 and a mixer 30. A low-frequency oscillator of frequency $F \approx 1000$ Hz, for example, also feeds the single sideband modulator 26 whose output has a frequency $f_R = f + F$. The signal from the modulator 26 is coupled through a circulator 28 to the antenna 10 and illuminates the aircraft. Echoes are received by the same antenna and coupled through the circulator to a mixer 30 where they are mixed with the output of the rf oscillator 24. The output signals of the mixer which are at frequencies F and $F + f_d$ resulting from transmitter leakage through the circulator and doppler-shifted aircraft echoes enter a subtractor 32 where being a sample of the low-frequency source signal F, after being attenuated by attenuator 36 and phase-shifted by phase shifter 38, is used to cancel out the transmitter leakage signal. The resultant doppler echo signal $F + f_{d1}$ is then passed through an audio amplifier 40. After amplification, the doppler signal is coupled to a time interval counter which measures its frequency. This unit can, for example, be a frequency meter having a readout calibrated in terms of frequency. A time interval counter (frequency-measuring means) may simple be an electronic circuit which produces a spike output when a positive-going portion of the doppler-modulated wave passes through zero, measures (counts) the time interval between two successive spikes and converts the time interval to frequency by having its output calibrated in terms of frequency. The frequency (or period) measured is that of $F + f_{d1}$.

The outputs of the counters from both radars are then fed to a frequency subtractor 44 whose output is $f_{d2} - f_{d1}$, the frequency F being cancelled by the subtraction. This output is then fed to a crab angle computer 46 in which the value λ has been inserted and to which the value of the aircraft velocity V is fed. The computer calculates the value of the crab angle θ by solving equation (8).

Figure 5:
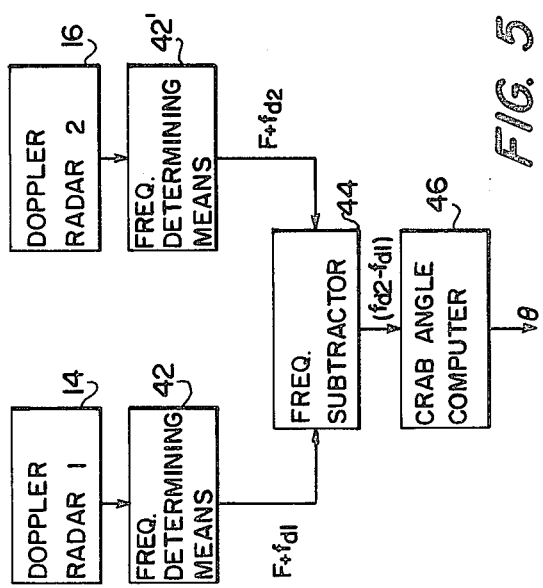
FIG. 5 is a generalized block diagram of the embodiment shown in FIG. 4.

A simplified, generalized block diagram of the components shown in FIG. 4 is provided in FIG. 5.

The advantages of this invention are that it does not require aircraft modification or augmentation, its operation is independent of aircraft size, shape or velocity, the radars are simple and relatively inexpensive, and the data processing equipment is straightforward and inexpensive to instrument.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. Apparatus for producing a signal having a frequency which is a function of the crab angle of an aircraft which is coming in for a landing along a runway comprising:

first doppler radar means, located at one side of the runway, for irradiating the side of the landing aircraft which is facing it, receiving an echo therefrom, and deriving a doppler-frequency signal from said echo, said radar means having an antenna facing so that it radiates normally to the direction of the runway;

second doppler radar means, located at the other side of the runway, for irradiating the side of the landing aircraft which is facing it, receiving an echo therefrom, and deriving a doppler-frequency signal from said echo, said second radar means having an antenna facing so that it radiates normally to the direction of the runway, the distances of said antennas to the middle of the runway being equal, and the operating frequencies of the radar means being substantially equal;

first frequency-determining means, receiving the doppler-modulated output signal of said first doppler radar means for determining the doppler frequency thereof and providing an output signal in accordance therewith;

second frequency-determining means, receiving the doppler-modulated output signal of said second doppler radar means, for determining the doppler frequency thereof and providing an output signal in accordance therewith;

frequency-subtraction means, receiving the output signals of said first and second frequency-determining means as inputs, for subtracting its input signals from each other, the resultant signal having a frequency which is a function of the crab angle of the aircraft.

2. Apparatus as in claim 1, wherein:

each said frequency-determining means comprises time-interval determining means for determining the time of one cycle of its input doppler-modulated signal, its output being calibrated in terms of frequency.

3. Apparatus for determining, in conjunction with means for supplying it with a signal proportional to the velocity of an aircraft which is coming in for a landing along a runway, the crab angle of said aircraft, said apparatus comprising:

first doppler radar means, located at one side of the runway, for irradiating the side of the landing aircraft which is facing it, receiving an echo therefrom, and deriving a doppler-frequency signal from said echo, said radar means having an antenna facing so that it radiates normally to the direction of the runway;

second doppler radar means, located at the other side of the runway, for irradiating the side of the landing aircraft which is facing it, receiving an echo therefrom, and deriving a doppler-frequency signal from said echo, said second radar means having an antenna facing so that it radiates normally to the direction of the runway, the distances of said antennas to the middle of the runway being equal, and the operating frequencies of the radar means being substantially equal;

first frequency-determining means, receiving the output signal of said first doppler radar means for determining the doppler frequency thereof and providing an output signal in accordance therewith;

second frequency-determining means, receiving the output signal of said second doppler radar means, for determining the doppler frequency thereof and providing an output signal in accordance therewith;

frequency-subtraction means, receiving the output signals of said first and second frequency-determining means as inputs, for subtracting its input signals from each other, the resultant signal having a frequency which is a function of the crab angle of the aircraft; and means, receiving said velocity signal and the output of said frequency-subtraction means as inputs and having the wavelength of said doppler radar means as a fixed input therein, for computing the crab angle of the aircraft from its inputs.

4. Apparatus as in claim 3, wherein said computing means calculates the crab angle according to the equation $$\theta = \arctan\left[\frac{\lambda (f_{d2} - f_{d1})}{4V}\right]$$

where $\theta$ is the crab angle of the aircraft, V is its velocity in the direction of the runway, $\lambda$ is the wavelength of the carrier frequency of the radar means, $f_{d1}$ is the frequency of the output of the first doppler radar means, and $f_{d2}$ is the frequency of the output of the second doppler radar means.

5. A method for determining the crab angle $\theta$ of an aircraft coming in for a landing along a runway between two doppler radars having their antennas equidistant from the center line of said runway and facing each other, said radars having carrier frequencies f and wavelengths $\lambda$ which are substantially equal, said method comprising the steps of:

irradiating one side of said aircraft with radiation from the one radar facing it and receiving an echo signal therefrom;

obtaining the doppler modulated signal from said one radar;

determining the frequency $F + f_{d1}$ of said doppler-modulated signal;

irradiating the other side of said aircraft with radiation from the other radar facing it and receiving an echo signal therefrom;

obtaining the doppler-modulated said other signal from radar;

determining the frequency $F + f_{d2}$ of the doppler-modulated signal of said other radar;

subtracting said two doppler-modulated signals to obtain the frequency difference $(f_{d2} + f_{d1})$ thereof:

determining the velocity V of said aircraft in the direction of the runway; and calculating the crab angle $\theta$ of said aircraft from the equation $$\theta = \arctan\left[\frac{\lambda (f_{d2} - f_{d1})}{4V}\right]$$

* * * * *